Patented Feb. 27, 1951

2,542,982

UNITED STATES PATENT OFFICE 2,542,982

UNSATURATED AMINE-SULFUR REACTION PRODUCTS AS LUBRICANT ADDITIVES AND LUBRICATING OILS CONTAINING SAME

John D. Bartleson and Everett C. Hughes, Cleveland, Ohio, assignors to The Standard Oil Company, Cleveland, Ohio, a corporation of Ohio No Drawing. Application July 3, 1946, Serial No. 681,417

9 Claims. (Cl. 252—47)

This invention relates to compositions suitable as lubricants and lubricant additives for use under various conditions, including high temperatures or high pressures or both, as for instance, use in an internal combustion engine operating at higher temperatures and in which the lubricant is in close contact with metallic surfaces, metal compounds and high temperature gases, and use as gear lubricants when surfaces must be lubricated which are subjected to high pressures.

The objects achieved in accordance with the invention include the provision of an agent which may be useful itself as a lubricant, and which, when added to lubricants, will markedly inhibit the very objectionable deposition of lacquer, acid and sludge formation, corrosion and other types of deterioration which tend to occur under operating conditions; the provision of lubricating oils containing such an addition agent; and other objects which will be apparent as embodiments are disclosed hereinafter.

In accordance with the invention, it has been found that elemental sulfur may be reacted with an unsaturated amine having at least about 10 to 12 carbon atoms at an elevated temperature, e. g., above about 200° F. and below temperatures at which the reaction product is decomposed, and the resulting reaction product will have good solubility in lubricating oils and greases. These reaction products have highly advantageous properties as additives for lubricants. They improve the corrosion, lacquer, sludge, viscosity increase, and the like characteristics of lubricating oils. They are also valuable as additives for extreme pressure lubricants. The other sulfur family elements, selenium and tellurium, function in much the same way as sulfur, and may be reacted similarly to give analogous reaction products which are suitable as additives for lubricating oils and greases.

The above reaction products may be used as antioxidants or stabilizers for organic materials which are subject to oxidative deterioration, e. g., elastomers, rubber, asphalt, plastic materials, paints, fats and fatty oils, gasoline, and the like.

The sulfur-amine reaction temperature conditions vary somewhat with the amine used, but in general the temperature is in the range of about 200° to about 400° F., preferably 250° to 300° F. Temperatures which are so high as to decompose or unduly darken the reaction product should be avoided. The reaction time varies somewhat with the amine and the temperature, as well as the relative amounts of reactants, subdivision of the reactants, rate of stirring, etc., and falls within the general range of from 1 minute to about 6 hours, preferably 1 to 3 hours. The ingredients may be added in increments if this is desirable for temperature control or for other reasons.

The reaction may be carried out in the presence or absence of air, or in a non-deleterious atmosphere, e. g. nitrogen or $H_2S$, if desired.

The sulfur-amine reaction may be carried out with direct admixture of the reactants, or by their admixture in the presence of a diluent which may or may not be subsequently removed. A volatile inert solvent, such as a saturated hydrocarbon boiling in the desired temperature range, may be used as a diluent which is to be subsequently removed. If a volatile solvent is used, it may be selected so as to have a boiling point that will assist in controlling the temperature if the reaction is carried out under reflux conditions. Alternatively, a heavier oil such as white oil, or a lubricating oil of about the same properties as that to which the new composition is to be added, may be used as a diluent which is not to be removed. In a commercial embodiment of the invention, a diluent probably would not be used unless it is a mineral oil, and a diluent is not necessary.

The unsaturated amine or mixture of amines may be reacted with the sulfur in ratios of about 0.1 to about 1.0 (gram) atom of sulfur per (gram) olefinic double bond carbon atom pair in the amine. Even small amounts show a significant improvement. Generally, about 0.5 to about 1.0 (gram) atom of sulfur is the usual range that will be used per (gram) olefinic double bond.

A large variety of unsaturated amines are suitable, for example, aliphatic, aromatic or heterocyclic tertiary amines containing at least one olefinic double bond per molecule, primary, secondary or tertiary; that is, they may or may not contain an amine hydrogen attached directly to the nitrogen. The choice of the amine may be controlled by the desired lubricant solubility characteristics of the final product. The preferred unsaturated amines contain at least 12 carbon atoms in the molecule and have an aliphatic hydrocarbon radical of at least 10 carbon atoms, and of these, those containing an olefinic double bond in a long chain radical are particularly preferred. The other constituents may be short chain aliphatic radicals, of from 1 to 5 carbon atoms. Analogous polyamines may be used.

Typical unsaturated amines are: octadecenyl-dimethylamine, hexadecenyl-dimethylamine, tetradecenyl-dimethylamine, dodecenyl-dimethylamine, decenyl-dimethylamine, and the corresponding tertiary amines wherein either one or both of the methyl groups are replaced by ethyl, propyl, butyl or pentyl radicals, or the corresponding dienyl or trienyl amines, or the corresponding unsaturated primary or secondary amines. The amine stock may be a mixture of amines of different molecular weight and different degrees of unsaturation. It need not be pure and amounts of other amines may be present, provided that the above unsaturated amine is the major or essential component. The amine stock should not be so highly unsaturated or conjugated as to give sulfur reaction products which are not oil dispersible.

The yield is very high. Generally, the amount of sulfur is chosen so that it will all react at the temperature selected, and the reaction is continued until it is consumed.

After the reaction is complete, the reaction mass is suitable for use as an additive, but preferably it is first centrifuged or filtered to remove any traces of oil-insoluble by-product substances. If a volatile solvent is used as a diluent, it may be removed by vacuum distillation at this stage.

These new compositions impart many desirable properties to lubricants to which they have been added. They act as inhibitors of corrosion and lacquer and sludge formation. They also improve the extreme pressure characteristics of lubricants.

The amount of the above described sulfur-amine reaction product to be added to an oil or grease will depend upon the characteristics of the oil or grease and the intended use. Some oils have more of a tendency to corrode metals, or to form acids, sludge and lacquer deposits than others, and such oils require larger quantities of the addition agent. Also oils that are intended for higher temperatures require larger amounts of the additive. In general, for lubricating oils the range is from 1 to 10% by weight but under some circumstances amounts as low as .01% show a significant improvement. There is no upper limit since the additive is a lubricant, but it may be uneconomical to add more than is necessary to impart to the lubricant the desired properties.

The following examples of the preparation of new compositions in accordance with the invention and table of results of tests of a lubricant comprising such a composition will serve to illustrate and point out some advantages but in no wise to limit the scope of the invention as otherwise disclosed and claimed herein.

Example 1

20.0 grams of 9-octadecenyl dimethylamine, 2.18 grams of sulfur and 60.0 grams of No. 225 Red oil (a conventional acid treated Mid-Continent lubricating oil base stock, of S. A. E. 20) were mixed and heated to 300° F. in a nitrogen atmosphere for 2 hours with agitation. There was no weight loss. The reaction mass was filtered hot and 78 grams of a dark oil filtrate was obtained as a product. This product was used in the test reported hereinafter.

Example 2

54 grams of a commercial primary unsaturated amine (analysis: 10% (by weight) hexadecylamine, 10% octadecylamine, 35% octadecenylamine, and 45% octadecadienylamine) 19.2 grams of sulfur and 162 grams of No. 225 Red oil (a conventional acid treated Mid-Continent lubricating oil base stock, of S. A. E. 20) were mixed and heated to 300° F. in a nitrogen atmosphere for 2 hours with agitation. There was no weight loss. The reaction mass was filtered hot and a dark oil filtrate was obtained as a product. This product was used in the test reported hereinafter.

In order to demonstrate the properties of the sulfur-amine reaction products in improving the characteristics of lubricating oils, a representative additive was incorporated into a conventional lubricating oil. The lubricating oil containing this additive was tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September 1941, and in another paper by the same authors presented at the New York city meeting of the American Chemical Society in September 1944, published in Industrial and Engineering Chemistry, Analytical edition, vol. 17, No. 5, May 1945, pages 302–309. The latter paper also correlates the results of such laboratory tests with the so-called standardized "Chevrolet engine test."

Essentially the laboratory test equipment consists of a vertical thermostatically heated, large glass test tube, into which is placed a piece of steel tubing of about one-third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "Standard" test the temperature used is approximately the average temperature of the crankcase. The rate of air flow per volume of oil is adjusted to the same as the average for a test engine in operation. Of the catalytic effects, those due to iron are the most important. They are empirically duplicated by the addition of a soluble iron salt. Those due to lead-bromide are duplicated by its addition. In the "Standard" test, 0.012% of iron salt is added; and in the "Iron tolerance" test this is increased to 0.05%. The duration of the test is adjusted to that usually used in engine type tests. As is shown by the data in the papers referred to, the laboratory tests have been correlated with engine tests and the properties of the oil in an engine may be determined from the result of the laboratory tests.

The results given in the following table were obtained from a test using:

A 160 cubic centimeter sample of the lubricant composition
70 liters of air per hour
100 square centimeters of steel surface 4.4 square centimeters of copper-lead surface
1.0 square centimeter of copper surface
0.01% by weight of lead-bromide powder
0.05% soluble iron calculated as Fe2O3
(Ferric 2-ethyl hexoate in C. P. benzene)

The "Iron tolerance" tests were run at 280° F. for thirty-six hours. The lacquer is deposited on the steel tube and is determined by difference in weight of the tube after washing with chloroform and drying to constant weight. The corrosion was determined by difference in weight of the copper and heavy metal pieces after scrubbing with chloroform. The used oil was sufficient to enable the determination of all of the usual oil tests, viz. isopentane insolubles, viscosity, acid number, etc.

The data in the following table shows the results obtained in testing the new additive by the tests described.

"Iron tolerance" tests on a conventional Mid-Continent acid-treated heavy duty lubricating oil base stock (S. A. E. 30) and a composition containing this oil and sulfur-amine reaction products of the invention were run. The results given in the following table are representative.

Table 1

| Additive from Example No. | None | 1 | 2 |
|---|---|---|---|
| Concentration of Additive in percent by weight | 0 | 1.5 | 1.5 |
| Lacquer Deposit (in milligrams) | 39.4 | 6.3 | 4.4 |
| Sludge (isopentane insoluble in milligrams) | 809.2 | 69 | 200.6 |
| Corrosion (in milligrams) weight loss of: | | | |
| Copper-lead | 6.4 | 0.8 | 2.9 |
| Acid Number | 9.4 | 0.9 | 0.94 |
| Viscosity Increase (SUS) | 658 | -2 | 84 |

These data show the marked improvement imparted to the lubricating oil by the sulfur-amine products of the invention. The very marked improvement in every indicated characteristic is particularly noteworthy, especially since these improvements are achieved with only 1.5% of the additive in the oil.

It will be obvious to one skilled in the art that sulfur-amine reaction products and similar products obtained by introducing sulfur into an amine as prepared according to different procedures but having substantially the same properties as those herein described, may be made up into lubricant compositions in accordance with the invention. The invention as claimed contemplates all such compositions except as do not come within the following claims.

We claim:

1. A lubricant comprising a mineral lubricating oil and an amount within the range of 0.01% to 10% by weight to inhibit the deterioration of the oil in use of an oil dispersible reaction product of an olefinic unsaturated amine containing at least 12 carbon atoms and an aliphatic hydrocarbon radical having at least 10 carbon atoms and 0.1 to 1.0 atom of sulfur per olefinic double bond in said amine reacted at a temperature in the range of 200° to 300° F. for a time within the range of 1 to 3 hours to form an oil dispersible reaction product.

2. A lubricant comprising a mineral lubricating oil and an amount within the range of 0.01% to 10% by weight to inhibit the deterioration of the oil in use of an oil dispersible reaction product of an unsaturated amine containing at least 12 carbon atoms and an aliphatic hydrocarbon radical having at least 10 carbon atoms and at least one olefinic double bond and 0.1 to 1.0 atom of sulfur per olefinic double bond in said amine reacted at a temperature in the range of 200° to 300° F. for a time within the range of 1 to 3 hours to form an oil dispersible reaction product.

3. A lubricant comprising a mineral lubricating oil and an amount within the range of 0.01% to 10% by weight to inhibit the deterioration of the oil in use of an oil dispersible reaction product of an unsaturated tertiary amine containing a straight chain hydrocarbon radical having at least 10 carbon atoms and one olefinic double bond and 0.1 to 1.0 atom of sulfur per olefinic double bond in said amine reacted at a temperature in the range of 200° to 300° F. for a time within the range of 1 to 3 hours to form an oil dispersible reaction product.

4. A lubricant comprising a mineral lubricating oil and an amount within the range of 0.01% to 10% by weight to inhibit the deterioration of the oil in use of an oil dispersible reaction product of an amine having the formula

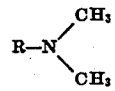

wherein R is an aliphatic hydrocarbon radical having at least 10 carbon atoms and containing one olefinic double bond and 0.1 to 1.0 atom of sulfur per olefinic double bond in said amine reacted at a temperature in the range of 200° to 300° F. for a time within the range of 1 to 3 hours to form an oil dispersible reaction product.

5. A lubricant comprising a mineral lubricating oil and an amount within the range of 0.01% to 10% by weight to inhibit the deterioration of the oil in use of a reaction product of an octadecenyl tertiary amine and 0.1 to 1.0 atom of sulfur per olefinic double bond in said amine reacted at a temperature in the range of about 200° F. to about 300° F. for a time within the range of 1 to 3 hours to form an oil dispersible reaction product.

6. A lubricant comprising a mineral lubricating oil and an amount within the range of 0.01% to 10% by weight to inhibit the deterioration of the oil in use of a reaction product of an octadecenyl dimethylamine and 0.1 to 1.0 atom of sulfur per olefinic double bond in said amine reacted at a temperature in the range of about 200° F. to about 300° F. for a time within the range of 1 to 3 hours to form an oil dispersible reaction product.

7. A lubricant comprising a mineral lubricating oil and an amount within the range of 0.01% to 10% by weight to inhibit the deterioration of the oil in use of an oil dispersible reaction product of an unsaturated primary amine containing a straight chain hydrocarbon radical having at least 10 carbon atoms and one olefinic double bond and 0.1 to 1.0 atom of sulfur per olefinic double bond in said amine reacted at a temperature in the range of 200° to 300° F. for a time within the range of 1 to 3 hours to form an oil dispersible reaction product.

8. A lubricant comprising a mineral lubricating oil and an amount within the range of 0.01% to 10% by weight to inhibit the deterioration of the oil in use of a reaction product of an olefinic unsaturated amine containing a straight chain hydrocarbon radical having at least 10 carbon atoms and 0.1 to 1.0 atom of sulfur per olefinic double bond in said amine reacted at a temperature within the range of 200° to 400° F. for a time within the range of 1 minute to six hours to form an oil dispersible reaction product.

9. The reaction product of an olefinic unsaturated amine having at least 12 carbon atoms and 0.1 to 1.0 atom of a sulfur family element per olefinic double bond in said amine reacted at a temperature within the range of 200° to 400° F. for a time within the range of 1 minute to six hours to produce an oxidation inhibitor for organic compounds.

JOHN D. BARTLESON.
EVERETT C. HUGHES.

REFERENCES CITED

The following references are of record in the file of this patent:

UNITED STATES PATENTS

| Number | Name | Date |
|---|---|---|
| 2,111,306 | Bartram | Mar. 15, 1938 |
| 2,162,208 | Moran | June 13, 1939 |
| 2,306,971 | McConnell | Dec. 29, 1942 |
| 2,308,691 | Hughes | Jan. 19, 1943 |
| 2,403,474 | Veatch | July 9, 1946 |
| 2,403,894 | Bartleson | July 9, 1946 |
| 2,419,153 | Musselman | Apr. 15, 1947 |